United States Patent
Gerakis et al.

(10) Patent No.: US 8,100,653 B2
(45) Date of Patent: Jan. 24, 2012

(54) GAS-TURBINE BLADE FEATURING A MODULAR DESIGN

(75) Inventors: Jeffrey-George Gerakis, Berlin (DE); Peter Davison, Wuensdorf (DE)

(73) Assignee: Rolls-Royce Deutschland Ltd & Co KG (DE)

(*) Notice: Subject to any disclaimer, the term of this patent is extended or adjusted under 35 U.S.C. 154(b) by 882 days.

(21) Appl. No.: 12/213,004

(22) Filed: Jun. 12, 2008

(65) Prior Publication Data

US 2008/0310965 A1  Dec. 18, 2008

(30) Foreign Application Priority Data

Jun. 14, 2007  (DE) .................. 10 2007 027 465

(51) Int. Cl.
*F01D 5/08* (2006.01)
(52) U.S. Cl. ...... 416/97 R; 416/90 R; 416/95; 416/96 A
(58) Field of Classification Search .............. 416/236 A
See application file for complete search history.

(56) References Cited

U.S. PATENT DOCUMENTS

| 6,514,046 | B1 | 2/2003 | Morrison et al. | |
|---|---|---|---|---|
| 7,080,971 | B2 | 7/2006 | Wilson et al. | |
| 2005/0265836 | A1* | 12/2005 | Mongillo et al. | 416/1 |
| 2006/0120869 | A1* | 6/2006 | Wilson et al. | 416/97 R |
| 2007/0140851 | A1* | 6/2007 | Hooper et al. | 416/97 R |

FOREIGN PATENT DOCUMENTS

| CH | 265293 | 11/1949 |
|---|---|---|
| EP | 1852572 | 11/2007 |
| GB | 1248110 | 9/1971 |
| GB | 2050529 | 1/1981 |

OTHER PUBLICATIONS

German Search Report dated Feb. 4, 2009 from counterpart application.

* cited by examiner

*Primary Examiner* — Cheung Lee
(74) *Attorney, Agent, or Firm* — Timothy J. Klima; Shuttleworth & Ingersoll, PLC

(57) ABSTRACT

A gas-turbine blade has a root 5 and an airfoil 2, with the airfoil 2 including an internal load carrier 6 as well as an airfoil element 8 enclosing the internal load carrier 6 by forming a cavity 7 extending along the longitudinal blade axis. The load carrier 6 is designed as a central element without cooling ducts and cooling air is introduced into the cavity 7 via the root 5.

20 Claims, 7 Drawing Sheets

GAS-TURBINE BLADE FEATURING A MODULAR DESIGN

Figure 1:
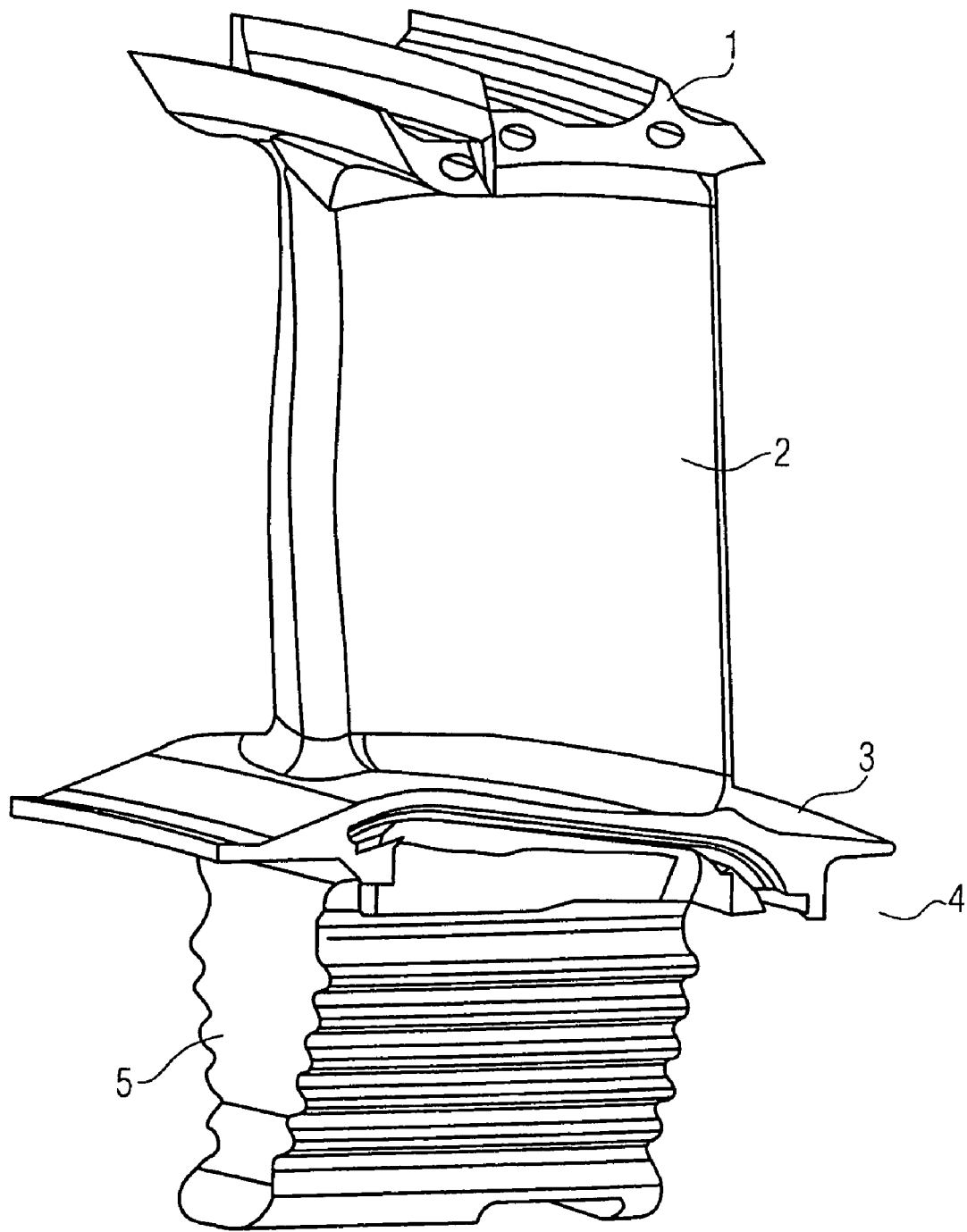

This application claims priority to German Patent Application DE102007027465.5 filed Jun. 14, 2007, the entirety of which is incorporated by reference herein.

The present invention relates to a gas-turbine blade having a root, an airfoil, an internal load carrier and an airfoil element enclosing the internal load carrier.

More particularly, the present invention relates to a gas-turbine blade with an airfoil which on a radially outward side is provided with a shroud and on a radially inward side is attached to a platform. The platform, in turn, is joined to a root by a rod (internal load carrier 6) and fixed to a disk, as known from the state of the art.

For the state of the art, reference is made to the two specifications US 2006/0120869 A1 and U.S. Pat. No. 7,080,971 B2.

Most gas-turbine rotor blades are nowadays made from forgings or precision castings.

Compressor blades are typically made from forgings and feature thin, radially staggered cross-sections.

Turbine blades are typically made from complex precision castings (FIG. 1) using a lost-wax casting process. This is very time-consuming and cost-intensive.

In order to cope with creep elongation and the detrimental effects of the hot-gas environment, turbine blades have radially staggered cross-sections which are thicker than those of compressor blades. They contain cooling-air discharge holes (surface layer cooling and trailing edge discharge cooling) requiring additional internally cast cooling-air supply ducts. The pressure difference is always positive so that the cooling air always issues to the outside into the gas path.

Turbine blades are typically made as equiaxial, directionally solidified or single-crystal castings. These castings are subsequently finished by mechanical machining and polishing of the airfoil surfaces to obtain a high degree of surface quality. In order to avoid sulfidation and oxidation, a thin and expensive aluminising coating is finally applied to the blades.

Since the turbine blades are subject to very high mechanical speed (and thus to high CF forces/centrifugal forces) (FIG. 2) and a hot, chemically aggressive environment, they suffer from a certain degree of creep elongation and deterioration.

The lost-wax casting process is a manual, highly time and work-consuming manufacturing method liable to defects, such as shrinkage, in particular as regards the internal cooling ducts.

Moreover, constraints imposed by the manufacturing process may conflict with an optimum design of the internal cooling ducts.

In order to take up the very high centrifugal forces (CF tension) experienced by the blades as they rotate at high speed, the side walls of the blades must have a reasonably thick cross-section which, however, increases blade weight and, consequently, the CF tension on the blade fir-tree roots.

The disadvantages of this conventional design method are as follows:
  Necessity to manufacture a single casting from a single material which is the best solution with regard to creep elongation, but is a compromise in terms of other performance requirements on the blade.
  The airfoil-shaped surface serves both as centrifugal-force load carrier and aerodynamic load carrier. These conflicting requirements may impair the aerodynamic optimisation of the side wall surfaces.
  The one-piece design incurs problems and constraints as regards blade repair. Frequent problem areas on turbine blades are burn-off of the thin trailing edges around mid span, with the same problem also arising at the leading edge, although to a lesser degree, and sulfidation corrosion of the aerodynamic surfaces.

In a broad aspect, the present invention provides for a gas-turbine blade of the type specified at the beginning above, which is of simple design and easy, cost-effective producibility.

The present invention accordingly relates to a novel design and a new manufacturing method for turbine blades.

The present invention provides for turbine blades designed and manufactured from separate, modular items, which are subsequently assembled to form a complete turbine blade arrangement.

This modular design principle is applicable to blades for fans and compressors. Maximum cost, performance and manufacturing benefit is currently obtained in turbine blade design.

The advantage is that each modular item is optimized for its task and function by selecting the best material for the respective purpose. This has advantages over a monolithic blade design in which the one material selected must withstand different loads, cover a variety of conflicting functions and is subject to various potential failure mechanisms.

The centrifugal-force tensile load in consequence of rotational speed is taken up by a central rod module disposed radially and/or between the inner and the outer platform module. This central rod module is arranged in an interior of a profile-shaped box module and is externally cooled by cooling air flowing into the blade cavity around the central rod (internal load carrier 6).

The aerodynamic loads are borne by an internally cooled, profile-shaped box module. The box is subject to aerodynamic loads and to a compressing centrifugal-force load resulting from its own weight and the sliding type of design at the inner end. However, these compressing loads typically amount to only 10 percent of the centrifugal-force tensile loads. The expansion of the box in consequence of the temperature compensates for the contraction due to the centrifugal-force tensile loads applied.

Figure 3A:
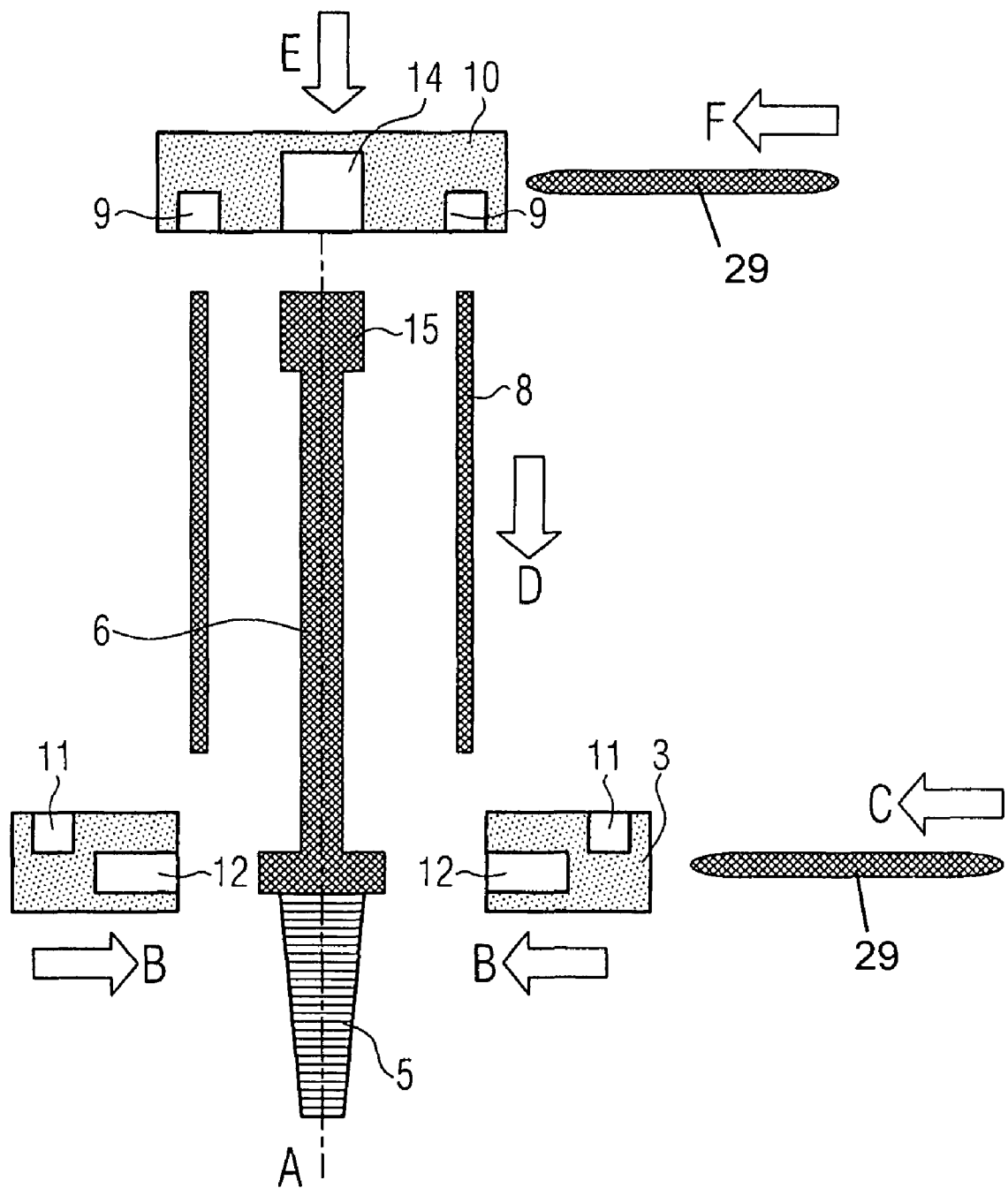
Figure 3B:
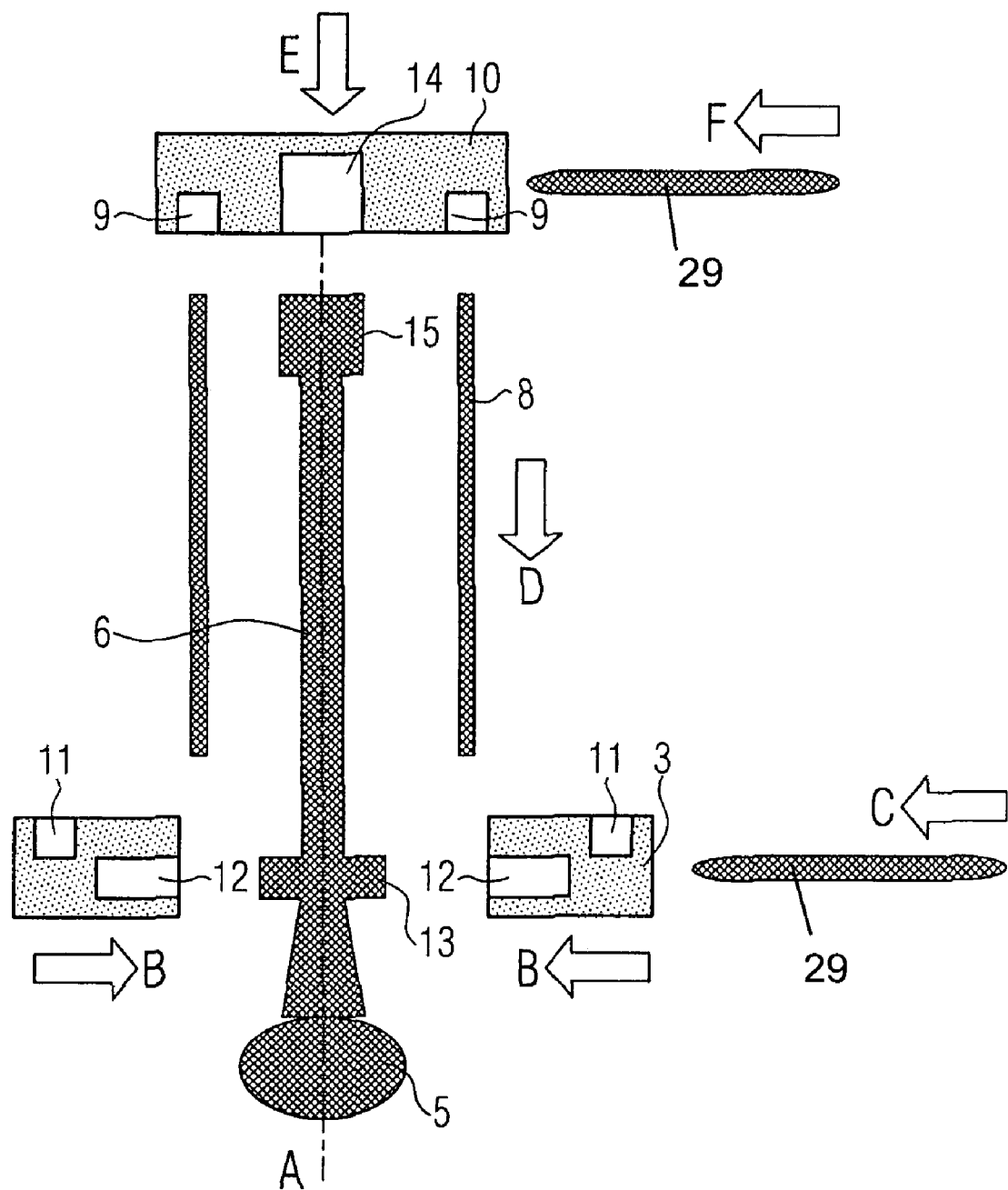
Figure 3C:
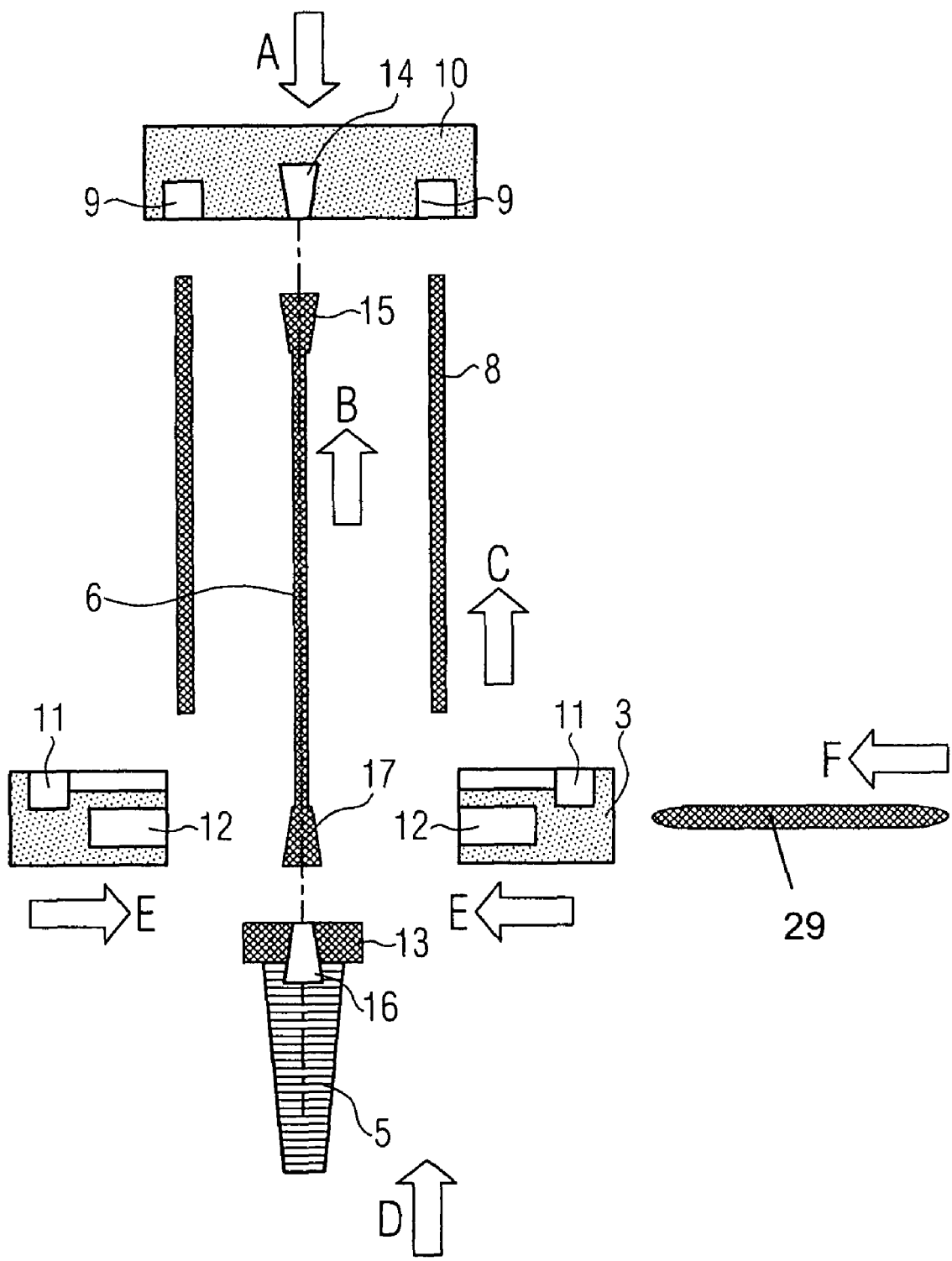
Figure 3D:
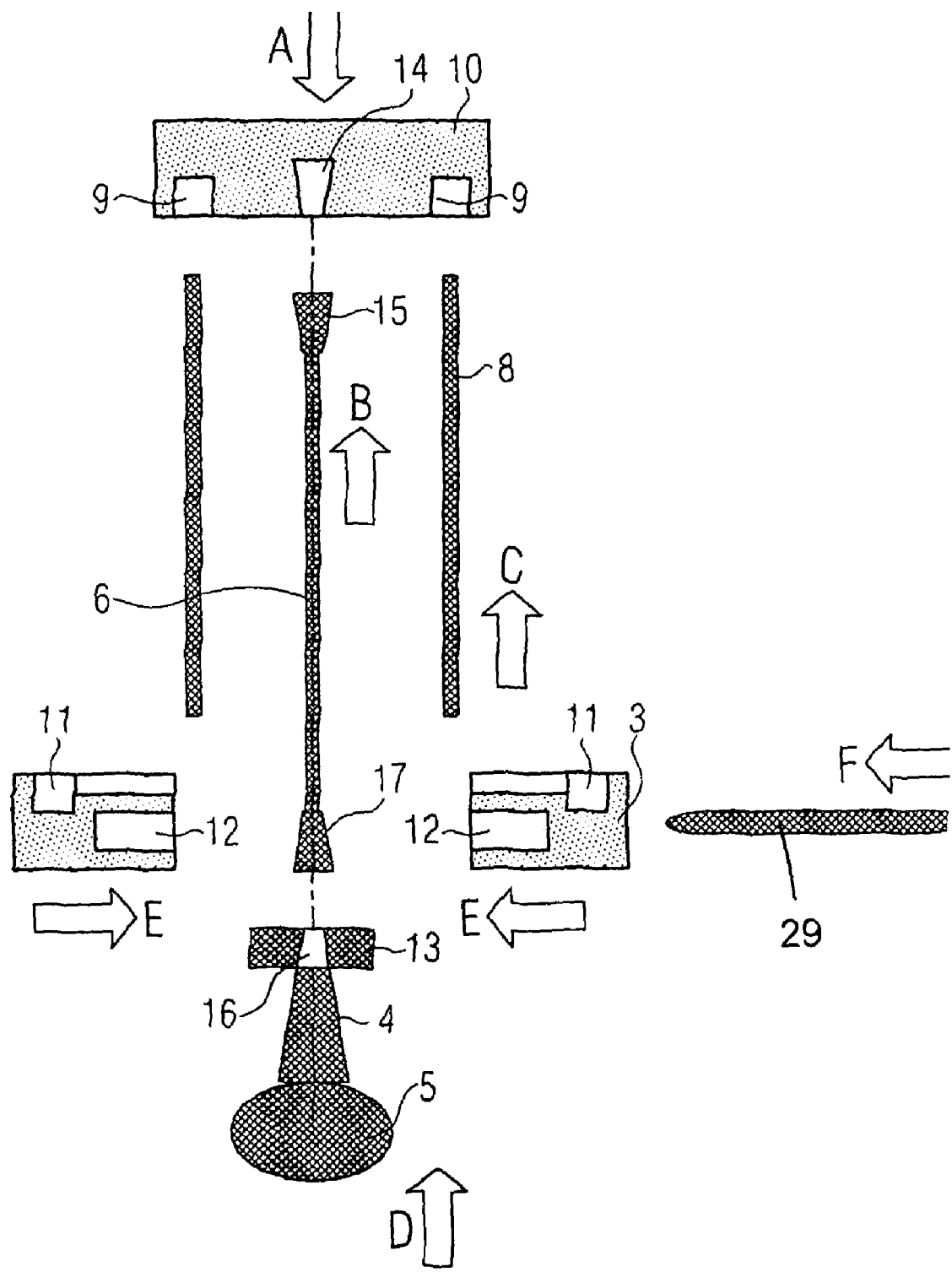
Figure 4:
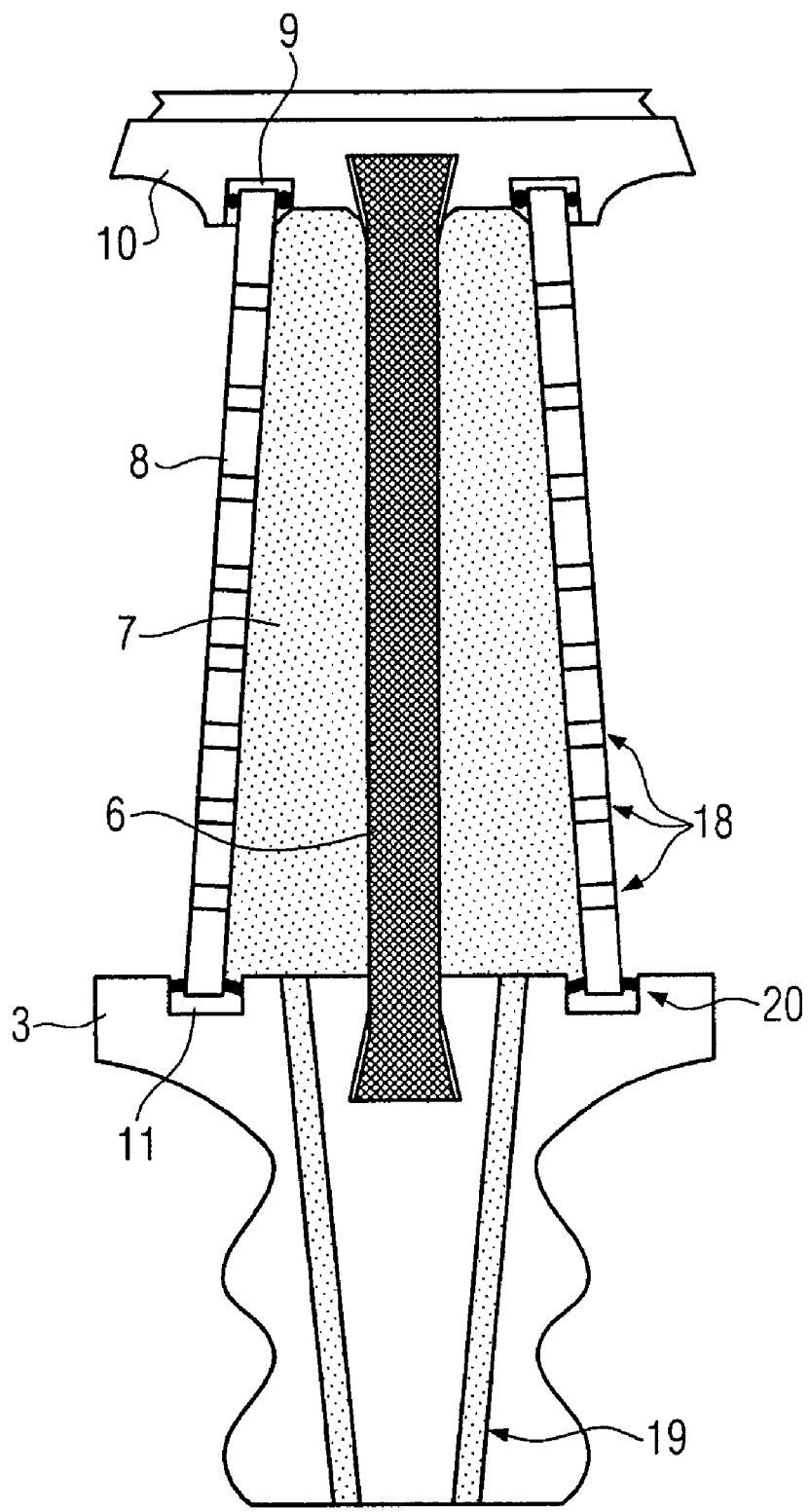

The present invention is more fully described in light of the accompanying drawings showing preferred embodiments. In the drawings, FIG. 1 is a perspective schematic representation of a gas-turbine blade in accordance with the state of the art, FIG. 2 is a representation of the loads occurring on a gas-turbine blade, FIG. 3A shows a first embodiment of a gas-turbine blade according to the present invention in exploded view, illustrating the manufacturing sequence, FIG. 3B shows a second embodiment, analogically to FIG. 3A, FIG. 3C shows another embodiment of a gas-turbine blade according to the present invention, analogically to FIGS. 3A and 3B, FIG. 3D shows a further embodiment of a gas-turbine blade according to the present invention, and FIG. 4 shows a sectional view of a finish-assembled embodiment of a gas-turbine blade according to the present invention.

In the following embodiments, identical parts are identified using the same reference numerals.

FIG. 1 shows a perspective view of a gas-turbine blade according to the state of the art. The blade comprises a shroud 1, an airfoil 2, a platform 3, a rod 4 and a root 5 designed as fir-tree root.

Figure 2:
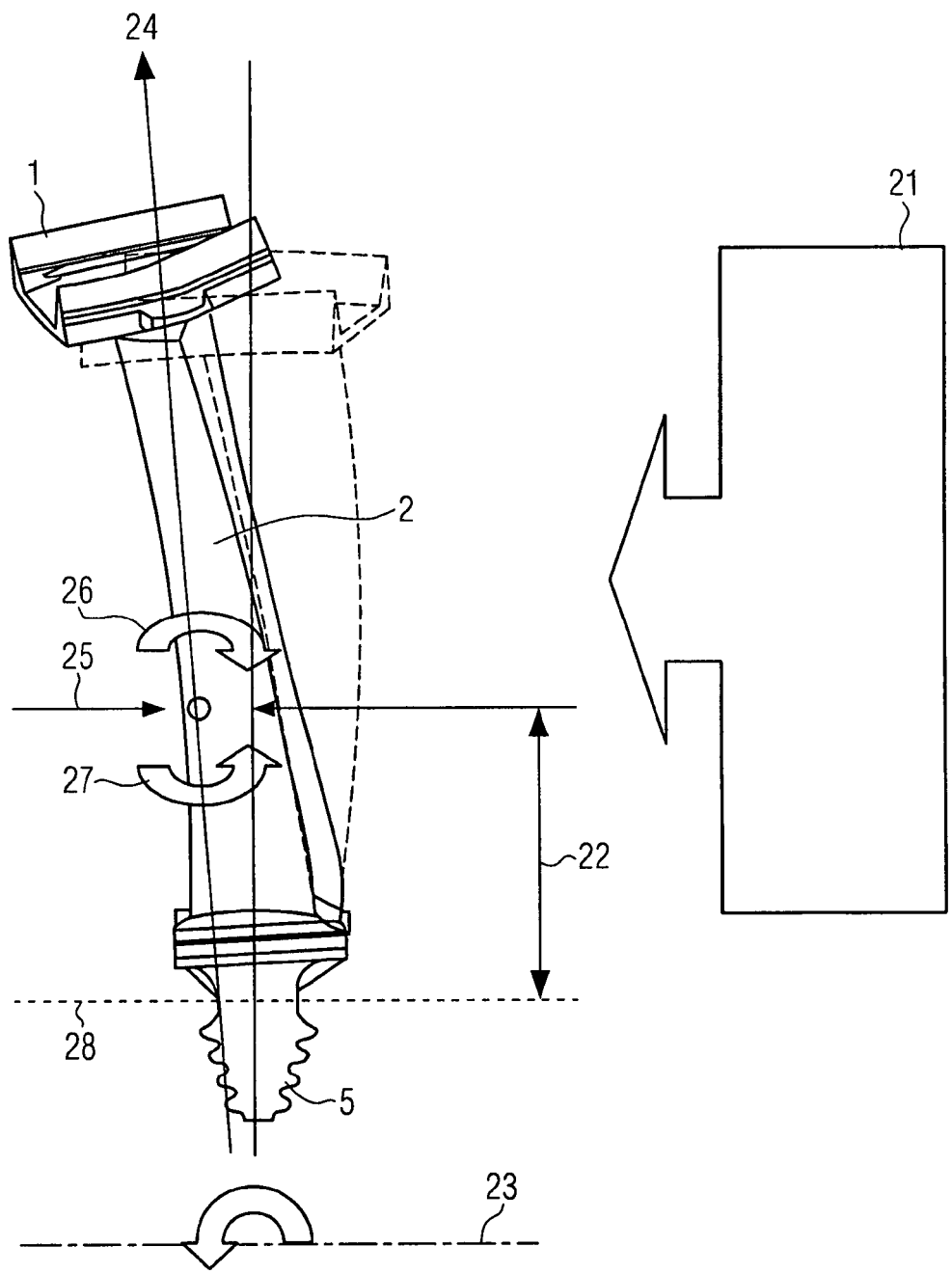

FIG. 2 shows the loads occurring on a gas-turbine blade according to the state of the art. A gas load 21 (big arrow) results in a moment arm 22 for the gas load. Rotation about a machine axis 23 results in a centrifugal force 24 pertaining to a centrifugal-force moment arm 25. Reference numeral 26 designates a centrifugal-force couple, reference numeral 27 a gas-force couple. Reference numeral 28 indicates a clamping area (compensation element) of the blade root 5.

Four different embodiments of the gas-turbine blade according to the present invention are shown in FIGS. 3A, 3B, 3C and 3D.

As shown in FIG. 3A, the design according to the present invention includes the following components:

Firstly, a radially disposed, central rod (internal load carrier 6) with integral fir-tree root 5 is provided. The central rod (internal load carrier 6) carries the CF tensile force from the fir-tree fixation to the outer tip of the airfoil 2.

The rod (internal load carrier 6) is made of twisted skein fiber in carbon nanotube (CNT). Twisted skein fiber in CNT has a much higher loadability than high-strength steel fiber with the same diameter and is also capable of withstanding very hot environments (unless impregnated with a binder matrix). The flexible CNT fiber rod (internal load carrier 6) is fitted into the upper platform and, via conical ceramic end attachments, into the fir-tree root. These also prevent the fibers from separating.

Furthermore, a one-piece, profile-shaped airfoil element 8 (box) is provided which replaces the conventional airfoil 2 and is the aerodynamic surface for gas loads. Compressive loads on the airfoil element 8 (box) itself are produced only by the design-intrinsic mechanical CF loads.

The outer platform 10 is a separate part and is connected on a radially inner side to the radial rod (internal load carrier 6). The aerodynamic airfoil element 8 is fitted to the outer platform 10 (bearing block) in a profile-shaped slot 9 similar to the slot 11 in the inner platform 3. The CNT rod (internal load carrier 6) is fitted into the upper outer platform 10.

An inner platform 3 with a narrow slot 11 with large aspect ratio into which the box (airfoil element 8) is inserted. The bottom end of the box (airfoil element 8) is fitted into this slot 11 which is provided with damper protrusions 20 (see FIG. 4) to laterally restrain the box (airfoil element 8) and avoid vibration at its bottom end (which essentially is a free end). However, the damper protrusions permit a sliding movement in the radial direction. To facilitate manufacture and assembly, the inner platform 3 is provided as a split element comprising a right and a left part. The inner platform is bolted together with threaded fasteners 29 and is safely connected to the central rod (internal load carrier 6) to produce a complete blade arrangement. The threaded fasteners 29 can also engage the internal load carrier 6 at both the radially inner and radially outer portions to secure the inner platform 3 and the outer platform 10, respectively, to the internal load carrier 6.

A small amount of radial clearance is permitted in the airfoil element 8 because of heat expansion. The airfoil element 8 and the platform slots 9, 11 provide for the original stability of the blade if the turbine is at rest (not rotating).

As the turbine starts to rotate, the CF tensile load is taken up by the CNT rod (internal load carrier 6).

The design as per FIG. 3D includes the following:

This design is similar to the one described in the above for FIG. 3C, except that the fir-tree root 5 is now replaced by a dovetail root. The central rod (internal load carrier 6) carries the CF tensile load from the dovetail root attachment to the outer tip of the blade.

The dovetail root design is easier to manufacture than the fir-tree root design and can be the best solution as the modular turbine blades according to the present invention are lighter than the conventional blade designs. A heavier part experiences a stronger CF tension and requires a fir-tree root attachment to equally distribute the load.

FIGS. 3A to 3D each show arrows lettered A to F to illustrate the manufacturing sequence.

As provided in FIG. 3A, the halves of the inner platform 3 are joined in steps A and B so that slots 12 engage a butt 13 on the root 5. Locking is accomplished in step C, and the aerodynamic airfoil element 8 is fitted into the slots 11 of the inner platform 3 in step D. In step E, the outer platform 10 is mounted in that the airfoil element 8 is inserted into the slot 9 and a radially outward butt 15 on the internal load carrier 6 fitted into a recess 14 of the outer platform 10. Subsequently, locking is performed in step F.

The assembly sequence according to FIG. 3B is performed in a similar way.

In the assembly sequence according to FIGS. 3C and 3D, a recess 16 is additionally provided in the butt 13 into which the butt 17 of the internal load carrier 6 is inserted. All further manufacturing steps are performed analogically.

FIG. 4 shows a general assembly drawing of an embodiment of a gas-turbine blade according to the present invention. As can be best seen therein, the internal load carrier 6 is free of cooling air ducts and the root 5 and/or platform 3 includes cooling air ducts positioned between the internal load carrier 6 and the airfoil element 8 for introducing cooling air into the cavity 7. Such cooling air then exits the cavity 7 via the cooling air ducts 18 in the airfoil element 8. Since, the centrifugal-force tensile load in consequence of rotational speed is taken up by the internal load carrier 6, it can be optimized for this task and function by selecting the best material for the respective purpose. The internal load carrier 6 is externally cooled by the cooling air flowing through the cavity 7 and its structure does not have to be compromised to provide for internal cooling thereof.

Advantages of the design according to the present invention:

Modularity enables material properties and manufacture to be exactly tuned to requirements.

The central rod (internal load carrier 6) (FIGS. 3A and 3B) can be made of a forging bar or a similar material with optimized tensile strength.

The central rod (internal load carrier 6) can alternatively be made of two parts: one part, fir-tree root or dovetail root, in a forged alloy and one part in an advanced material, such as twisted skein fiber in carbon nanotube (CNT). The central rod (internal load carrier 6), which carries the platforms 3, 10 and the profile-shaped box (airfoil element 8) will thus be considerably lighter, thereby reducing the total CF load on the blade root 5. Twisted skein fiber in CNT has a much higher roadability than high-strength steel fiber with the same diameter and is capable of withstanding very hot environments (unless impregnated with a binder matrix). The internal load carrier 6 is externally cooled by the cooling air flowing through the cavity 7 and it does not require or include cooling air ducts.

The designs according to the present invention can be lighter, thus eliminating the need for a heavy and expensive fir-tree design. A dovetail design may be sufficient.

Since the profile-shaped box (airfoil element 8) need not be made of a single-crystal casting, suitable material (e.g. Nimonic alloy, ceramic metal etc.) may be used to obtain optimum properties and resistance to sulfidation.

The novel, profile-shaped boxes (airfoil element 8) can be tested more quickly and cheaply than conventional blades by simply exchanging the profile-shaped box (airfoil element 8).

Since the novel designs are lighter, the offset angle of the blade roots can be nearly parallel to the machine axis, thus eliminating loading of the root corners. In consequence, thinner, lighter disks are possible.

Requirements on cooling can be relaxed so that less cooling air is required. This is mainly due to the central rod (internal load carrier 6) being uncooled (internally) in such a design.

Advantages for manufacture:

The rod (internal load carrier 6) can be made of a single-piece forging. Operations: Turning of the cylindrical rod (internal load carrier 6) (if cylindrical), cutting the fir-tree root, milling the faces on the cylindrical rod (internal load carrier 6) for internal and external platform attachment points.

Alternatively, the rod (internal load carrier 6) may be made as a separate part in twisted CNT skein fiber.

Inner and outer platforms: Casting or forging, then machining by milling. The slot can be produced by spark erosion.

Profile-shaped box (airfoil element 8): Can be superelastically formed in one piece, or form-rolled as one left and one right part, with the two parts subsequently being joined by welding.

No anti-sulfidation coating required on the blades.

No need for airfoil transition between the profile-shaped box (airfoil element 8) and the inner and outer platforms.

Advantages for repair:

Besides the design and the manufacture in accordance with the present invention, this invention is also advantageous with regard to the repair of damaged blade surfaces.

Turbine blades of gas-turbine engines are frequently damaged at the airfoil leading and trailing edges by the extremely severe and aggressive operating environment. The modular design enables each damaged module to be replaced separately, providing a repaired blade arrangement in "as new" condition.

For example, a damaged profile-shaped box (airfoil element 8) or a platform (inner or outer one) (3, 10) can be simply and quickly replaced without replacing the expensive part of the blade, here the central rod (internal load carrier 6) and the root attachment to the turbine disk.

LIST OF REFERENCE NUMERALS

1 Shroud
2 Airfoil
3 Platform/inner platform
4 Rod
5 Root
6 Internal load carrier
7 Cavity
8 Airfoil element
9 Slot
10 Outer platform
11 Slot
12 Slot
13 Butt
14 Recess
15 Butt
16 Recess
17 Butt
18 Cooling ducts for film cooling of airfoil element 8
19 Cooling ducts in root 5/platform 3
20 Damping element
21 Gas load
22 Moment arm
23 Machine axis
24 Centrifugal force
25 Centrifugal-force moment arm
26 Centrifugal-force couple
27 Gas-force couple
28 (Clamping Area) Compensation element
29 Threaded fasteners

What is claimed is:

1. A gas-turbine blade comprising:
a root;
an airfoil;
an internal load carrier;
the airfoil including an airfoil element separate from the internal load carrier and manufactured of a different material than the internal load carrier, the airfoil element having an internal cavity extending along a longitudinal blade axis and enclosing the internal load carrier positioned within the internal cavity;
wherein the internal load carrier is free of cooling air ducts that would weaken the internal load carrier, and is made of a high tensile strength material and constructed and arranged to bear a majority of a centrifugal force tensile load on the blade when the blade is rotating as compared to the airfoil element, and
wherein the root includes cooling air ducts positioned between the internal load carrier and the airfoil element for introducing cooling air into the cavity.

2. The gas-turbine blade of claim 1, wherein the root includes a platform and the cooling air is introduced via the platform.

3. The gas-turbine blade of claim 2, wherein the airfoil element is supported at a radially outer end area of the internal load carrier.

4. The gas-turbine blade of claim 3, wherein the airfoil element is subject to compressive loads during operation.

5. The gas-turbine blade of claim 4, wherein the airfoil element is slidingly supported at a radially inner end area of the internal load carrier.

6. The gas-turbine blade of claim 5, wherein the airfoil element is of a multi-part design.

7. The gas-turbine blade of claim 6, wherein the airfoil element is of a joined construction.

8. The gas-turbine blade of claim 7, wherein the internal load carrier is constructed of carbon fiber.

9. The gas-turbine blade of claim 8, wherein the airfoil element is constructed of a ceramic material.

10. The gas-turbine blade of claim 9, wherein the internal load carrier is connected to a radially outward bearing block in the form of an outer platform.

11. The gas-turbine blade of claim 10, wherein a radially inward end section of the internal load carrier is positively connected to the root.

12. The gas-turbine blade of claim 7, wherein the internal load carrier is constructed of hollow carbon fiber.

13. The gas-turbine blade of claim 1, wherein the airfoil element is supported at a radially outer end area of the internal load carrier.

14. The gas-turbine blade of claim 1, wherein the airfoil element is slidingly supported at a radially inner end area of the internal load carrier.

15. The gas-turbine blade of claim 1, wherein the airfoil element is of a multi-part design.

16. The gas-turbine blade of claim 1, wherein the airfoil element is constructed of a ceramic material.

17. The gas-turbine blade of claim 1, wherein the internal load carrier is connected to a radially outward bearing block in the form of an outer platform.

18. The gas-turbine blade of claim 1, wherein a radially inward end section of the internal load carrier is positively connected to the root.

19. A gas-turbine blade comprising:
a root;
an airfoil;
an internal load carrier;
an airfoil element having an internal cavity extending along a longitudinal blade axis and enclosing the internal load carrier positioned within the internal cavity;
wherein the internal load carrier is free of cooling air ducts and the root includes cooling air ducts positioned between the internal load carrier and the airfoil element for introducing cooling air into the cavity;
wherein the internal load carrier is constructed of carbon fiber.

20. A gas-turbine blade comprising:
a root;
an airfoil;
an internal load carrier;
an airfoil element having an internal cavity extending along a longitudinal blade axis and enclosing the internal load carrier positioned within the internal cavity;
wherein the internal load carrier is free of cooling air ducts and the root includes cooling air ducts positioned between the internal load carrier and the airfoil element for introducing cooling air into the cavity;
wherein the internal load carrier is constructed of hollow carbon fiber.

* * * * *